United States Patent
Lieberman et al.

(10) Patent No.: US 10,403,158 B2
(45) Date of Patent: Sep. 3, 2019

(54) VERTICAL LANDING VEHICLE, SITUATIONAL AWARENESS SYSTEM, AND METHOD THEREOF

(71) Applicant: The Boeing Company, Chicago, IL (US)

(72) Inventors: Eric Lieberman, Broomall, PA (US); William Brendan Blanton, Wilmington, DE (US)

(73) Assignee: The Boeing Company, Chicago, IL (US)

( * ) Notice: Subject to any disclaimer, the term of this patent is extended or adjusted under 35 U.S.C. 154(b) by 47 days.

(21) Appl. No.: 15/480,927

(22) Filed: Apr. 6, 2017

(65) Prior Publication Data
US 2018/0293902 A1 Oct. 11, 2018

(51) Int. Cl.
| | |
|---|---|
| *G08G 5/02* | (2006.01) |
| *B64D 45/06* | (2006.01) |
| *B64D 45/08* | (2006.01) |
| *G05D 1/06* | (2006.01) |
| *G08G 5/04* | (2006.01) |
| *G01S 13/86* | (2006.01) |
| *G01S 13/88* | (2006.01) |
| *G01S 13/94* | (2006.01) |
| *G05D 1/08* | (2006.01) |

(52) U.S. Cl.
CPC ............. *G08G 5/025* (2013.01); *B64D 45/06* (2013.01); *B64D 45/08* (2013.01); *G01S 13/862* (2013.01); *G01S 13/867* (2013.01); *G01S 13/882* (2013.01); *G01S 13/94* (2013.01); *G05D 1/0676* (2013.01); *G05D 1/0858* (2013.01); *G08G 5/045* (2013.01)

(58) Field of Classification Search
CPC .......... G01S 13/93; G01S 13/94; G01S 13/86; G01S 13/862; G08G 5/0086; G08G 5/025; B64D 45/04; B64D 45/06; G05D 1/0676
USPC ............................................... 701/17; 342/29
See application file for complete search history.

(56) References Cited

U.S. PATENT DOCUMENTS 5,371,581 A * 12/1994 Wangler ................... G01S 7/51
340/946
5,448,233 A * 9/1995 Saban ................... G01S 7/4802
340/961

(Continued)

FOREIGN PATENT DOCUMENTS

| WO | 2011012102 | 2/2011 |
|---|---|---|
| WO | 20160149037 | 9/2016 |

OTHER PUBLICATIONS

European Search Report, European Application No. 18156605 dated Aug. 23, 2018.

*Primary Examiner* — Isaac G Smith
(74) *Attorney, Agent, or Firm* — Perman & Green, LLP

(57) ABSTRACT

A vertical landing vehicle including an airframe forming a hull and having at least one wing coupled to the airframe, at least one proximity sensor coupled to the airframe, and a flight control system including a control processor and an operator interface, the at least one proximity sensor being coupled to the control processor, the control processor being configured to receive proximity signals from the at least one proximity sensor and present, through the operator interface and based on the proximity signals, situational awareness information of obstacles within a predetermined distance of the vertical landing vehicle relative to the hull and/or the at least one wing.

20 Claims, 14 Drawing Sheets

(56) References Cited

U.S. PATENT DOCUMENTS

| | | |
|---|---|---|
| 9,384,670 B1 | 7/2016 | Fisher et al. |
| 9,387,938 B1 * | 7/2016 | Vanderkamp .......... B64D 45/00 |
| 2004/0217883 A1 | 11/2004 | Judge et al. |
| 2012/0127014 A1 | 5/2012 | Muensterer et al. |
| 2012/0194556 A1 * | 8/2012 | Schmitt ................ G08G 5/0086 345/641 |
| 2012/0229325 A1 * | 9/2012 | Dutruc ...................... G01S 7/03 342/29 |
| 2014/0125511 A1 | 5/2014 | Longstaff |
| 2015/0029044 A1 | 1/2015 | Dubois et al. |
| 2015/0194060 A1 * | 7/2015 | Mannon ............... G08G 5/0078 701/301 |
| 2015/0307203 A1 * | 10/2015 | Litwinowicz ........ G05D 1/0676 701/14 |
| 2016/0266256 A1 | 9/2016 | Allen et al. |

* cited by examiner

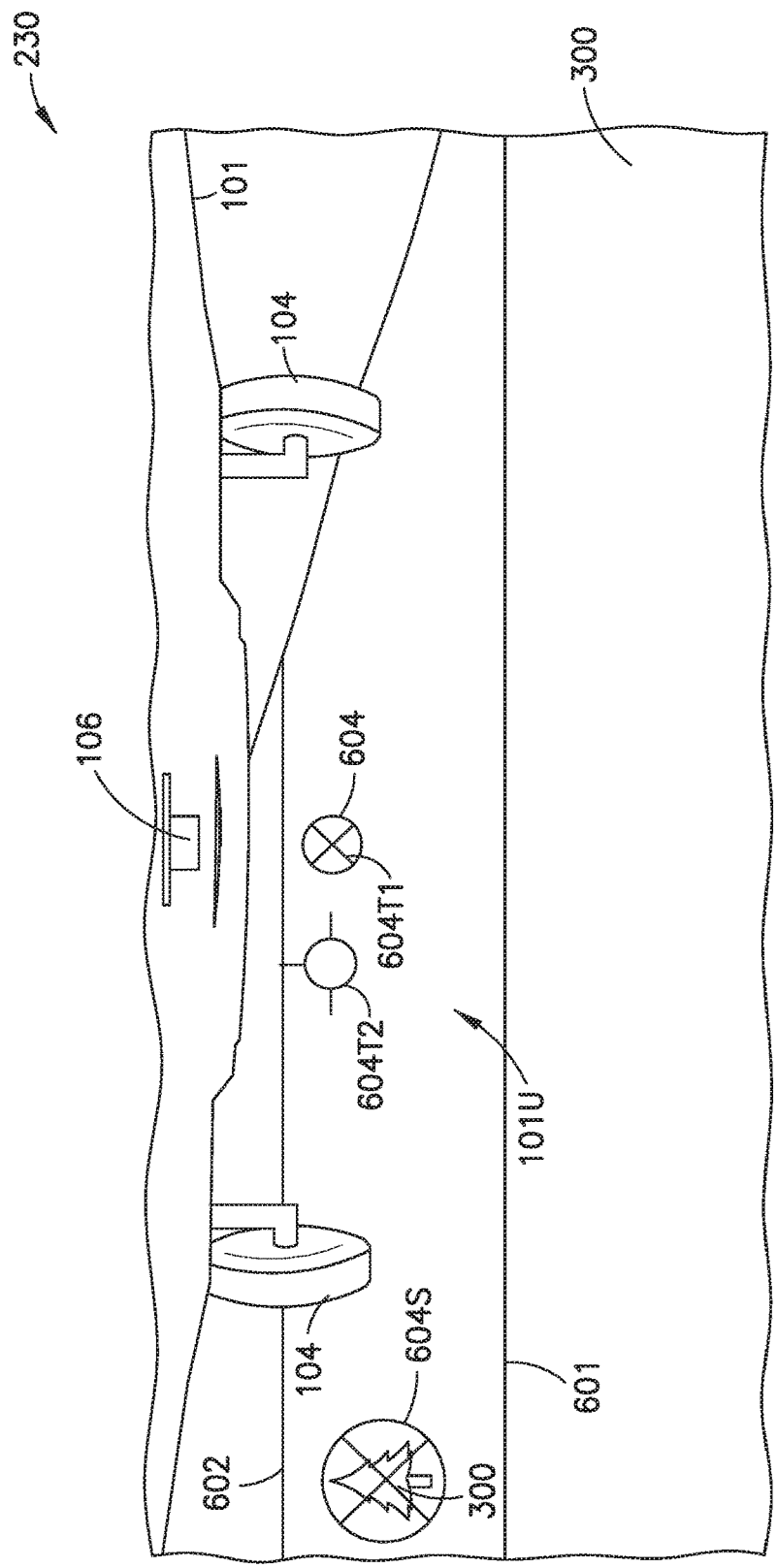

VERTICAL LANDING VEHICLE, SITUATIONAL AWARENESS SYSTEM, AND METHOD THEREOF

BACKGROUND

1. Field

The aspects of the present disclosure generally relate to vertical landing vehicle systems and in particular to situational awareness systems for vertical landing vehicles.

2. Brief Description of Related Developments

Pinnacle landings, such as an approach to elevated terrain, or landings in small landing zones, such as with vertical landing vehicles, are considered high workload, crew intensive tasks. During these landings, unintentional positioning of the vertical landing vehicle near terrain or other obstacles or the landings occurring in degraded visual environments (e.g., sand, dust, snow, fog, low or no light) may result in blade strikes, including tree strikes, pinnacle landing strikes, or strikes with other obstacles.

Generally, in an effort to prevent these blade strikes and/or pinnacle landing strikes, a crew member in the cabin partially exits the vertical landing vehicle to view underneath the vertical landing vehicle and provides verbal feedback regarding obstacles to the flight crew. In the event of degraded visual environments, the difficulty in accurately providing feedback regarding the position of the vertical landing vehicle increases.

The above problems are not addressed by conventional vertical landing vehicle systems.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to a vertical landing vehicle including an airframe forming a hull and having at least one wing coupled to the airframe, at least one proximity sensor coupled to the airframe, and a flight control system including a control processor and an operator interface, the at least one proximity sensor being coupled to the control processor, the control processor being configured to receive proximity signals from the at least one proximity sensor and present, through the operator interface and based on the proximity signals, situational awareness information of obstacles within a predetermined distance of the vertical landing vehicle relative to the hull and the at least one wing.

Another example of the subject matter according to the present disclosure relates to a situational awareness system for a vertical landing vehicle having an airframe forming a hull and having at least one wing coupled to the airframe, the situational awareness system including at least one proximity sensor coupled to the airframe, the at least one proximity sensor being configured to sense obstacles around a perimeter of one or more of the hull and the at least one wing, and a flight control system including a control processor and an operator interface, the at least one proximity sensor being coupled to the control processor, the control processor being configured to receive proximity signals from the at least one proximity sensor and present, through the operator interface and based on the proximity signals, situational awareness information of obstacles within a predetermined distance of the perimeter of the one or more of the hull and the at least one wing.

Still another example of the subject matter according to the present disclosure relates to a method for providing situational awareness to an operator of a vertical landing vehicle, the method including coupling at least one proximity sensor to an airframe of the vertical landing vehicle, the airframe forming a hull and having at least one wing coupled to the airframe, receiving proximity signals from the at least one proximity sensor with a control processor of a flight control system of the vertical landing vehicle, and presenting with the control processor, through an operator interface of the flight control system and based on the proximity signals, situational awareness information of obstacles within a predetermined distance of the vertical landing vehicle relative to the hull and the at least one wing.

BRIEF DESCRIPTION OF THE DRAWINGS

Figure 1:
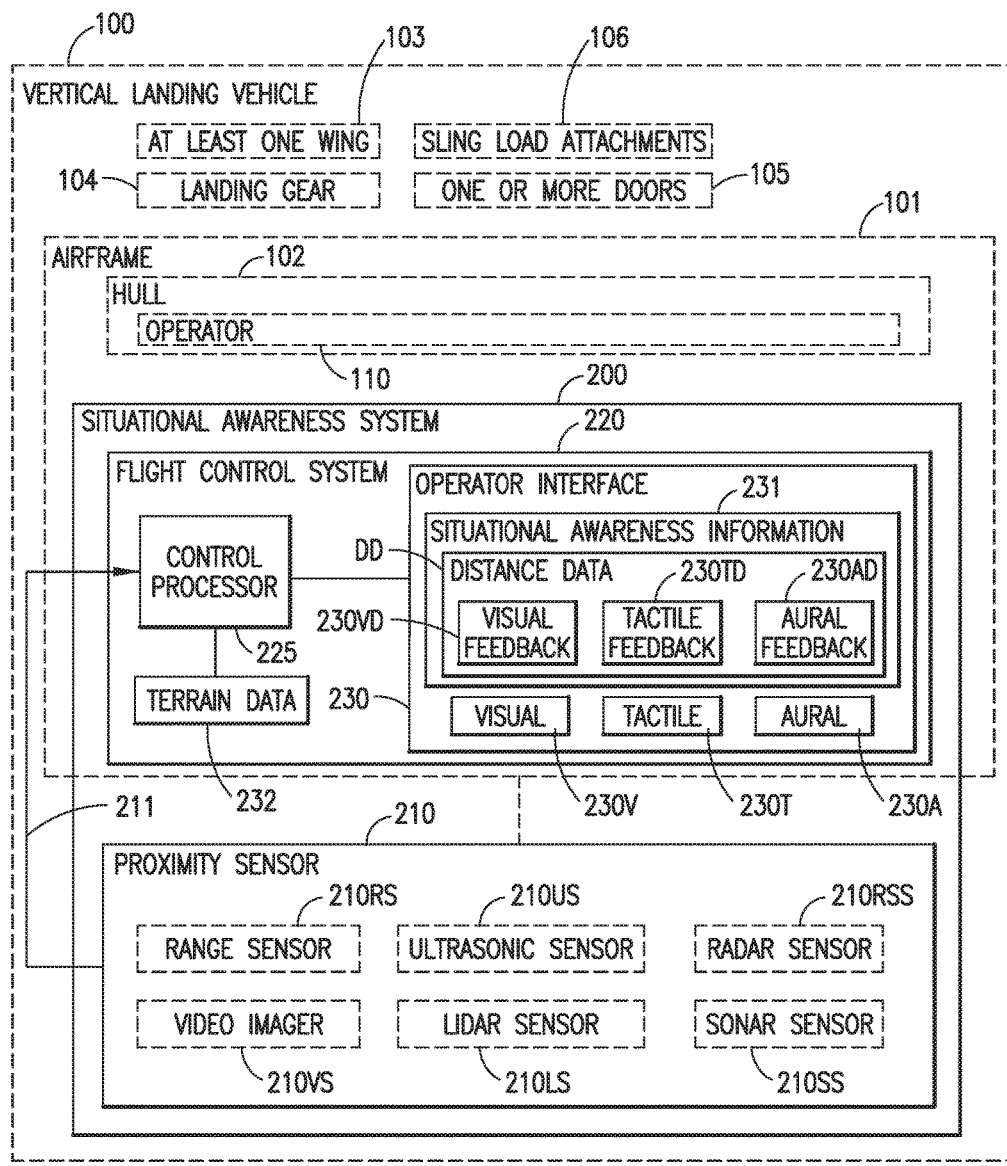
Figure 2:
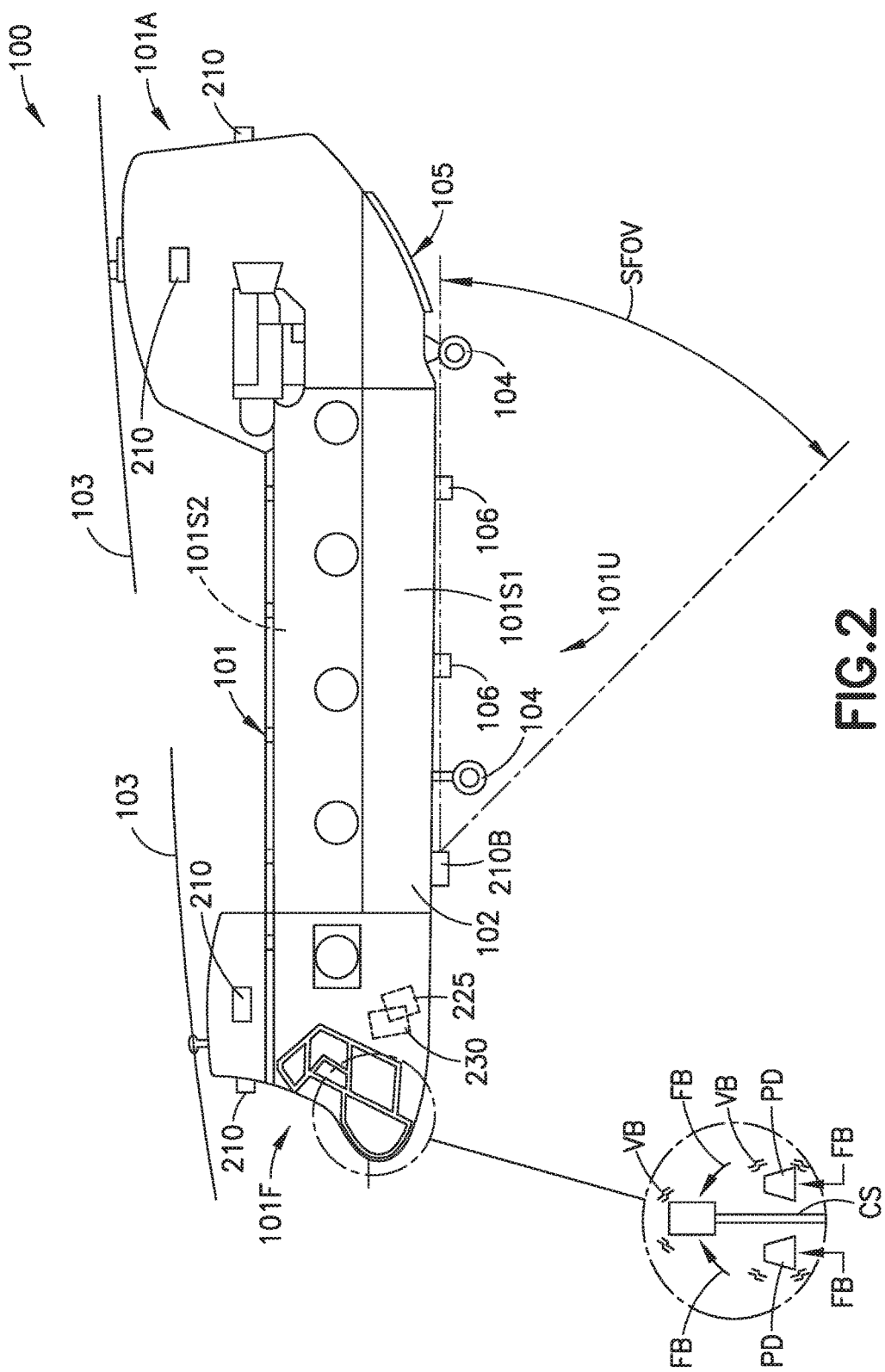
Figure 3:
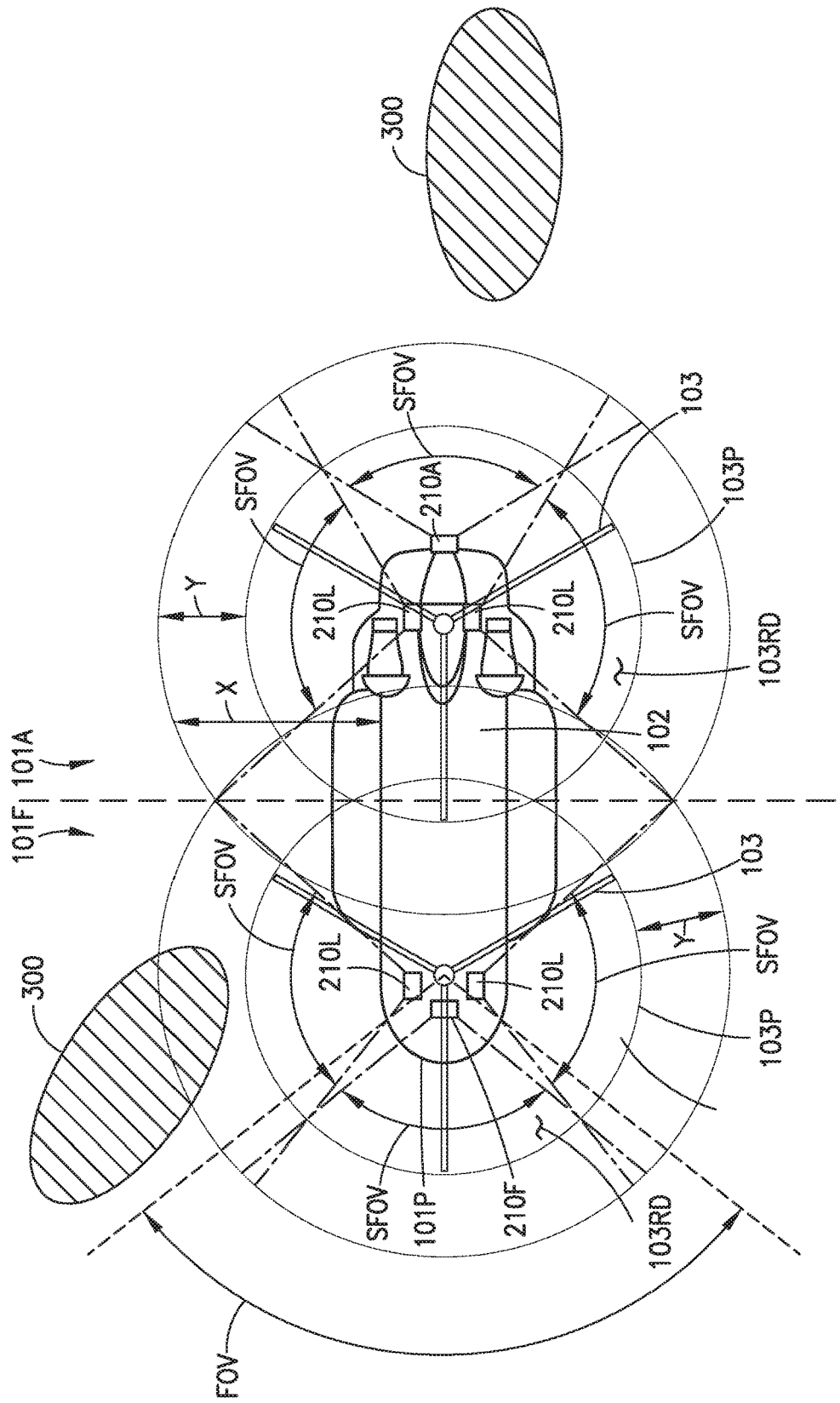
Figure 4A:
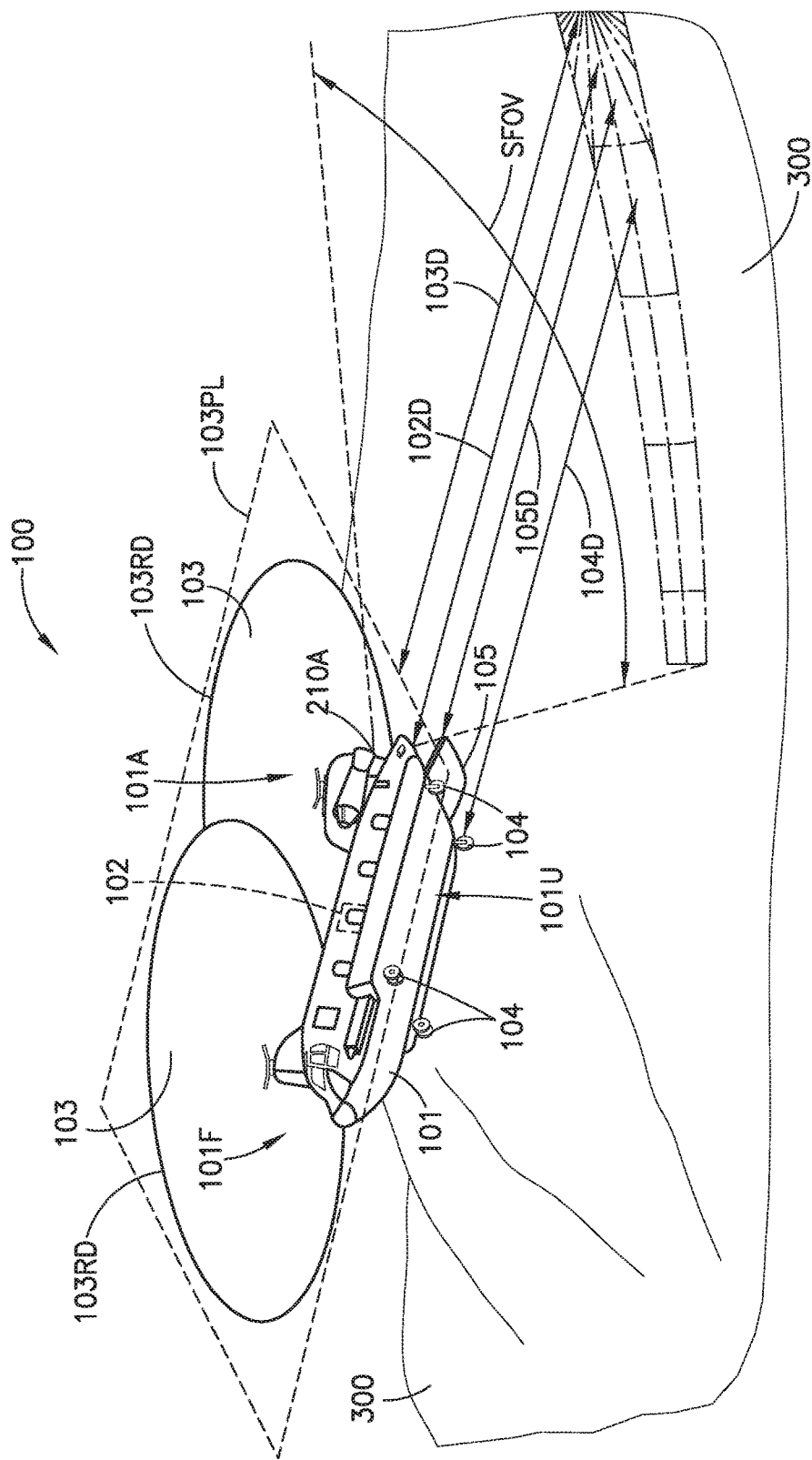
Figure 4B:
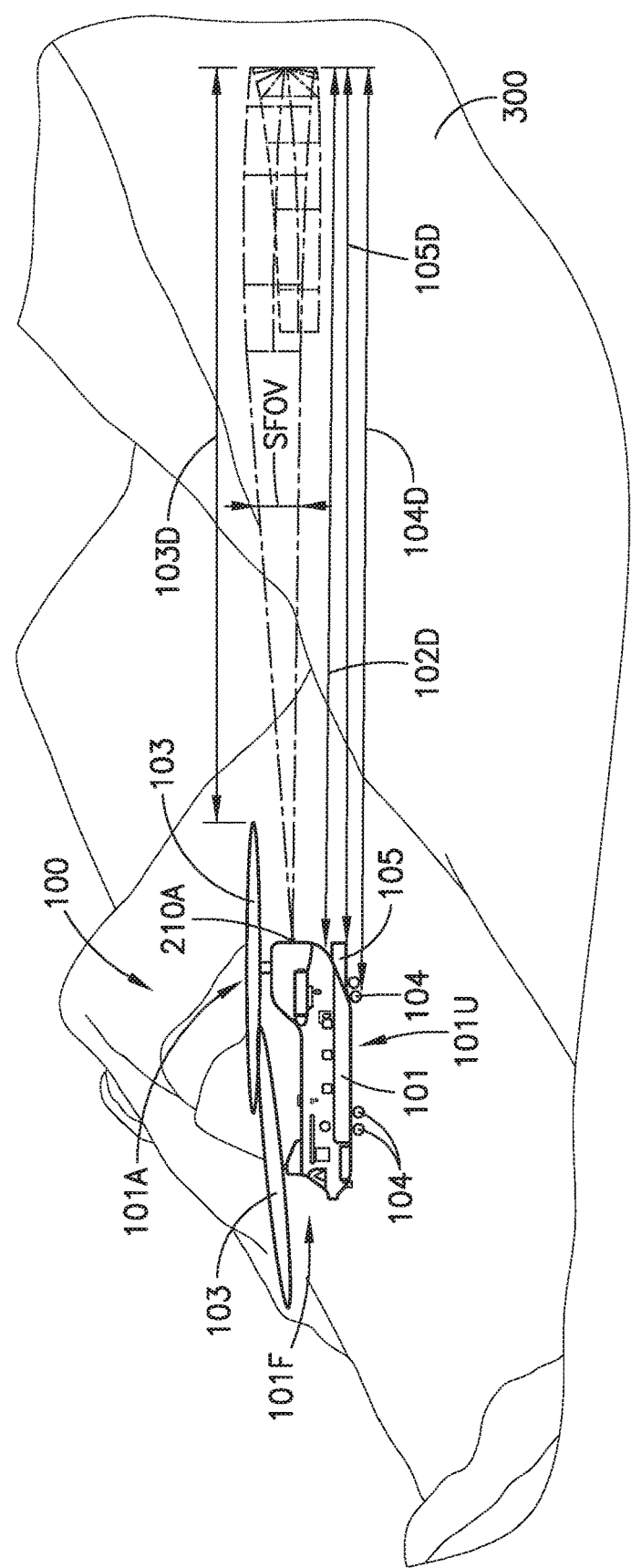
Figure 4C:
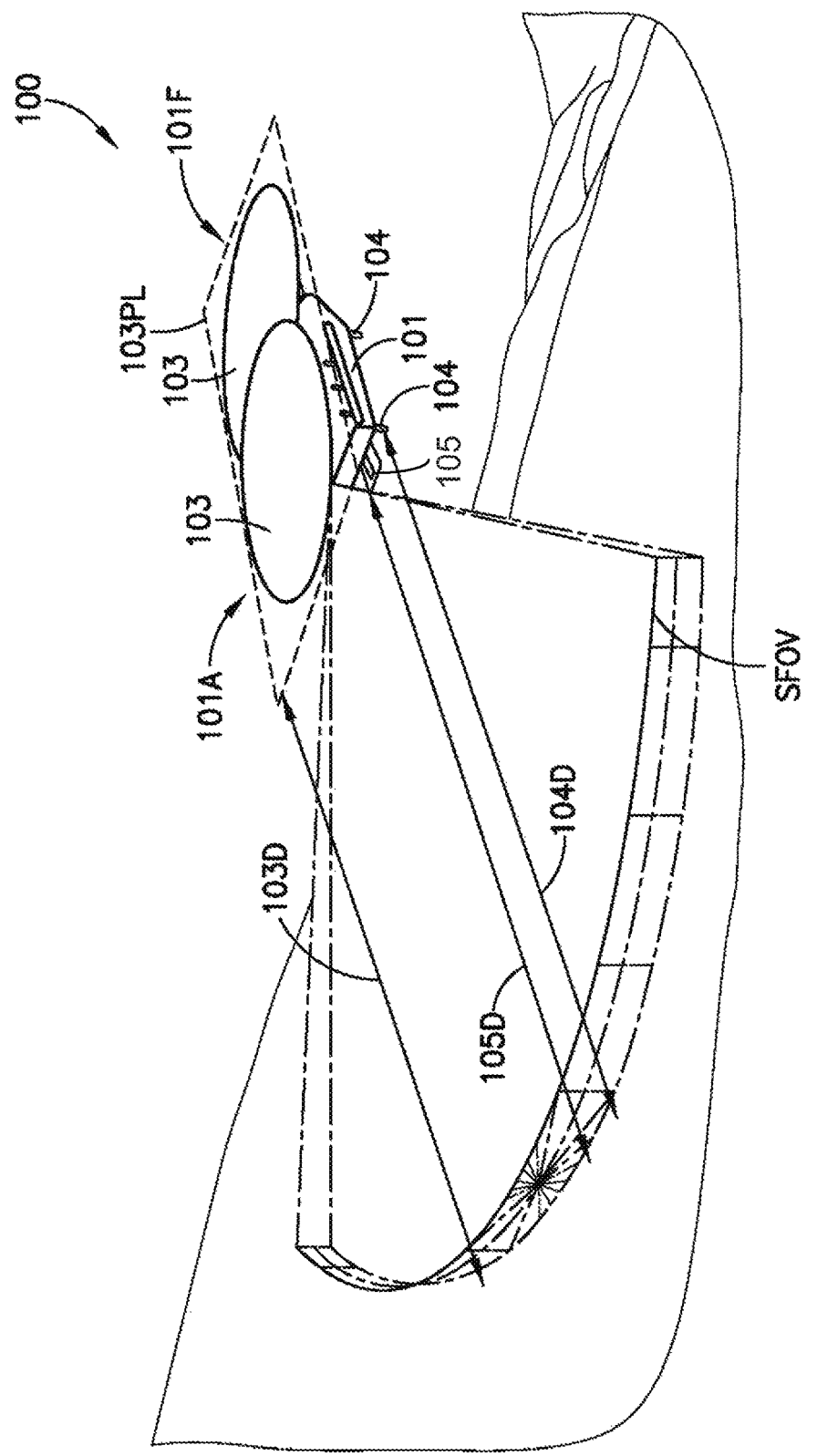
Figure 5A:
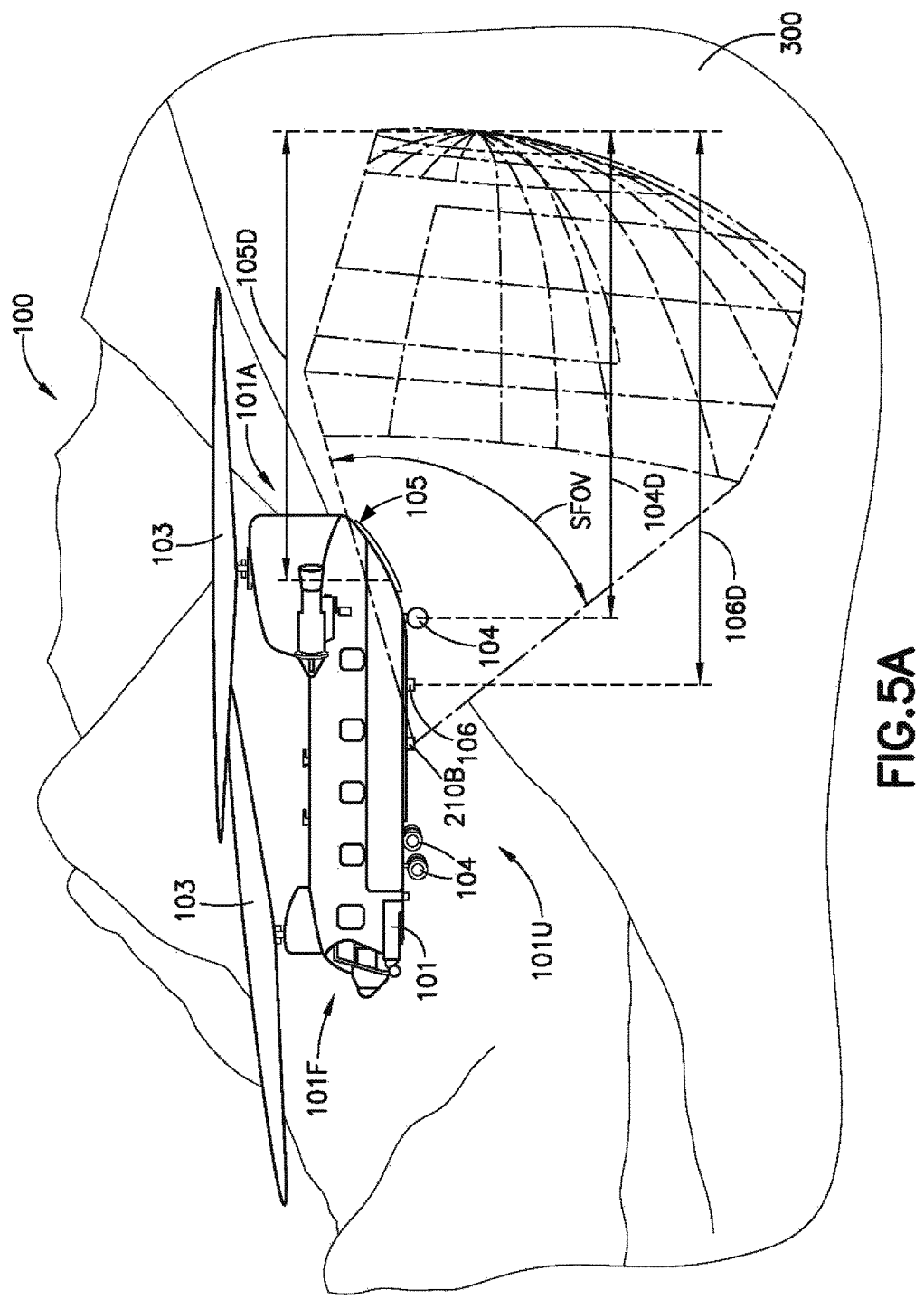
Figure 5B:
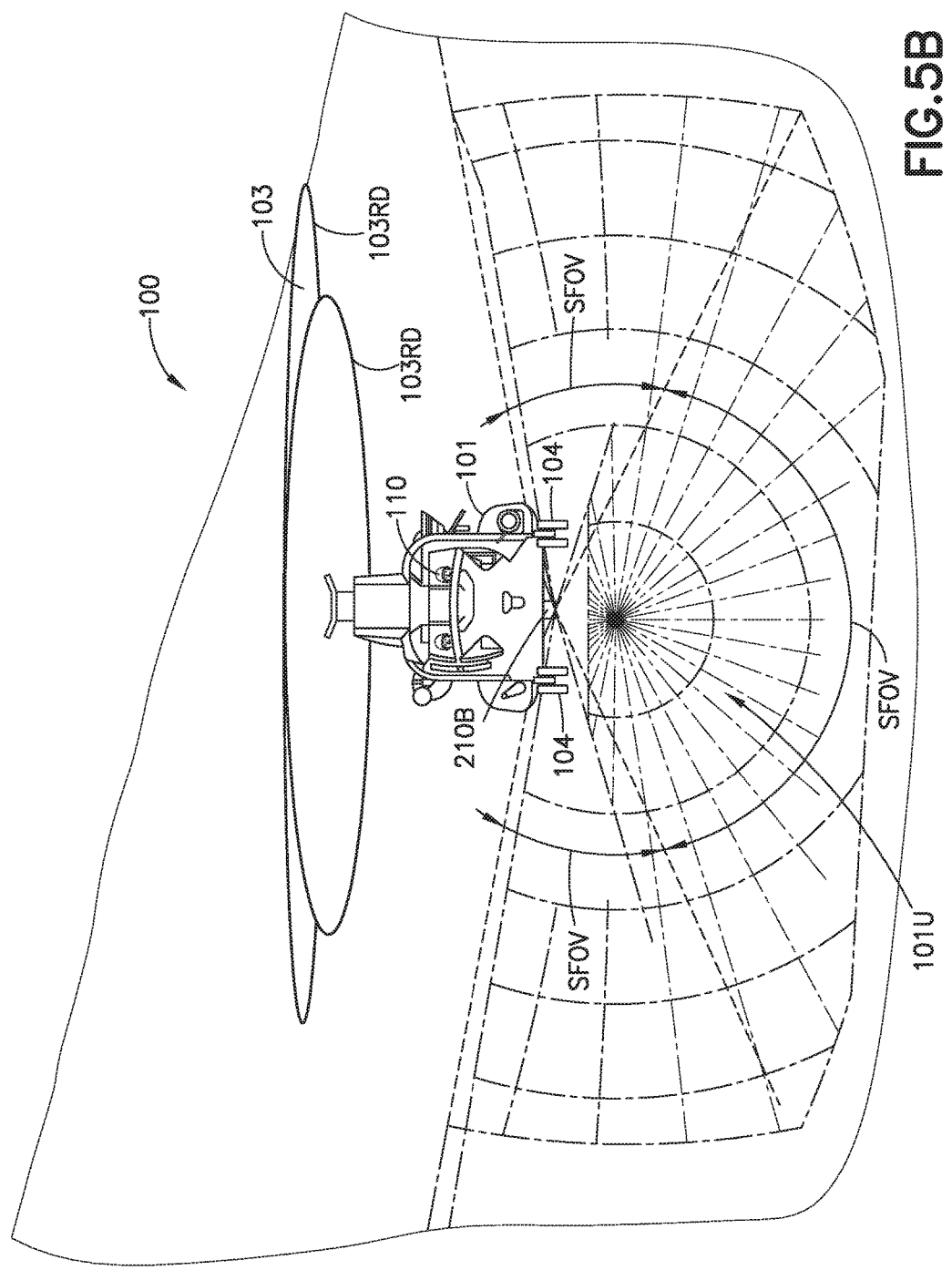
Figure 6A:
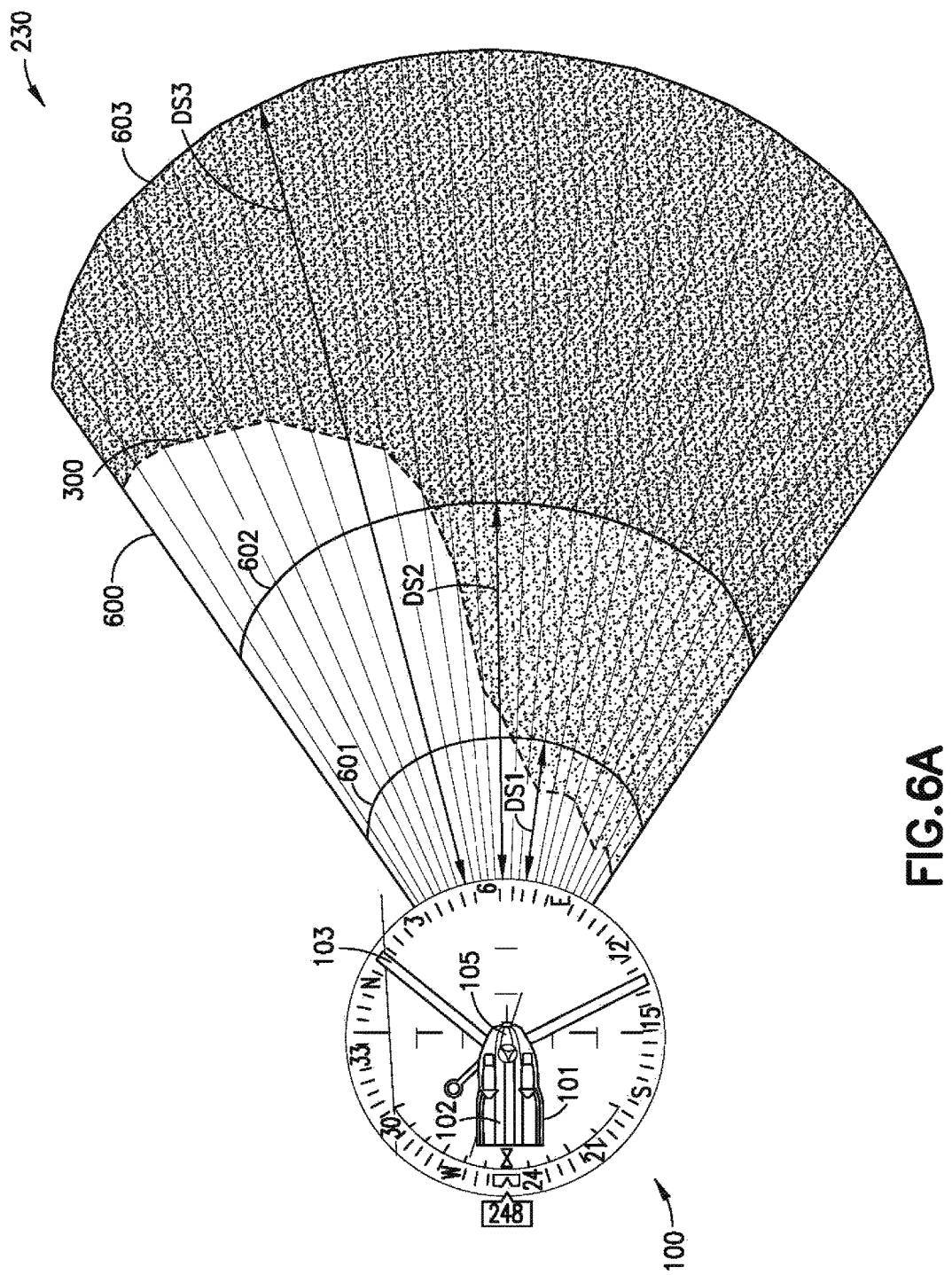
Figure 6C:
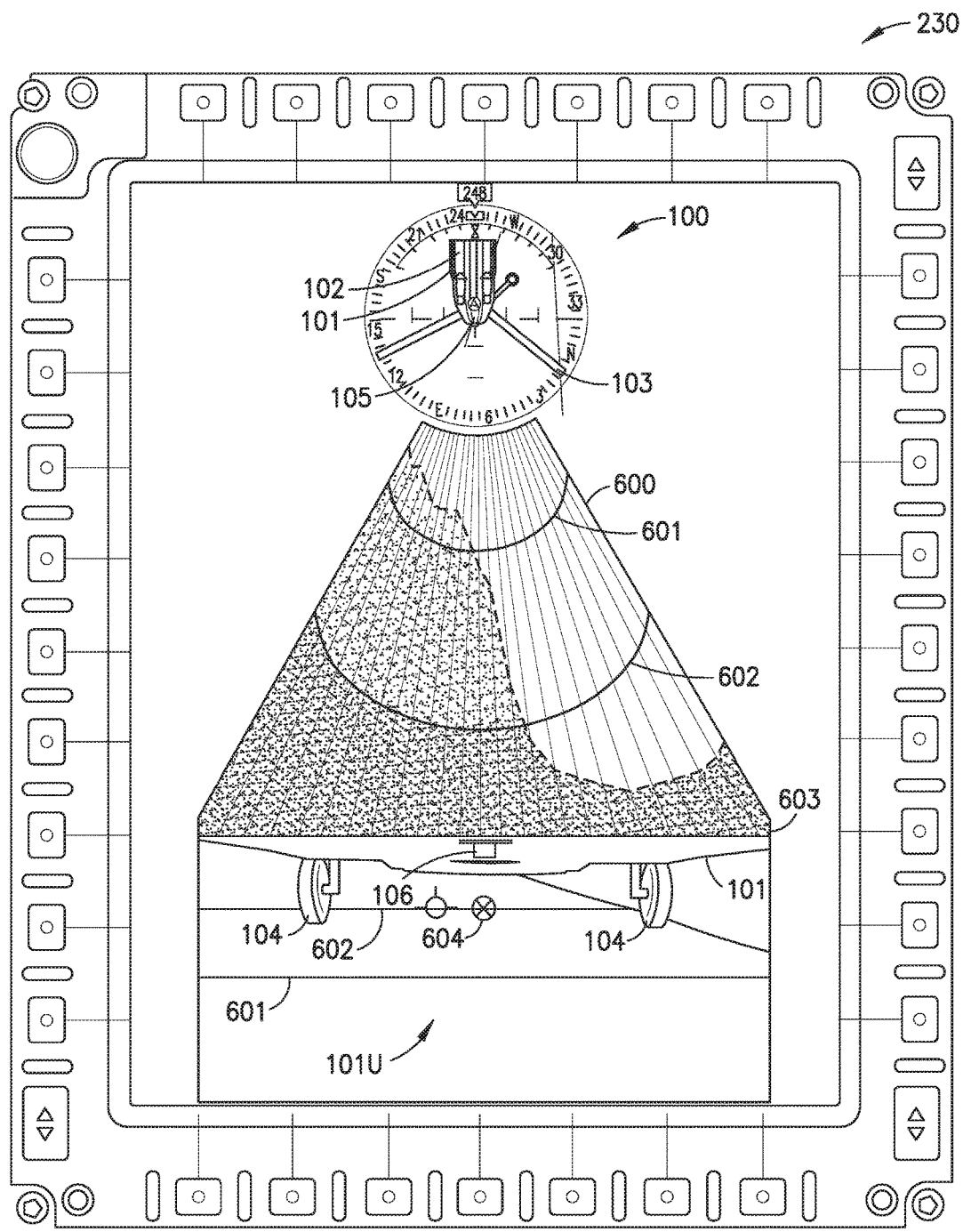
Figure 7:
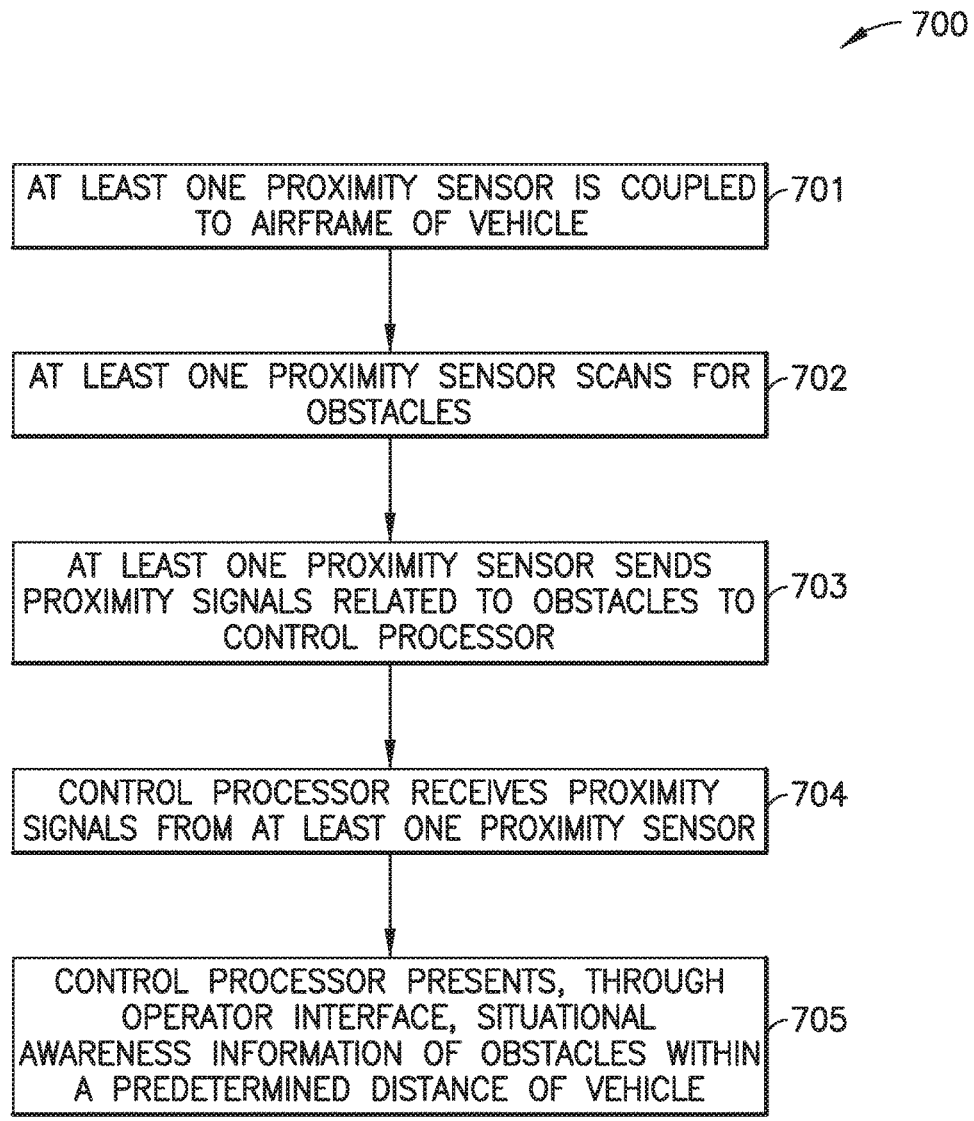
Figure 8:
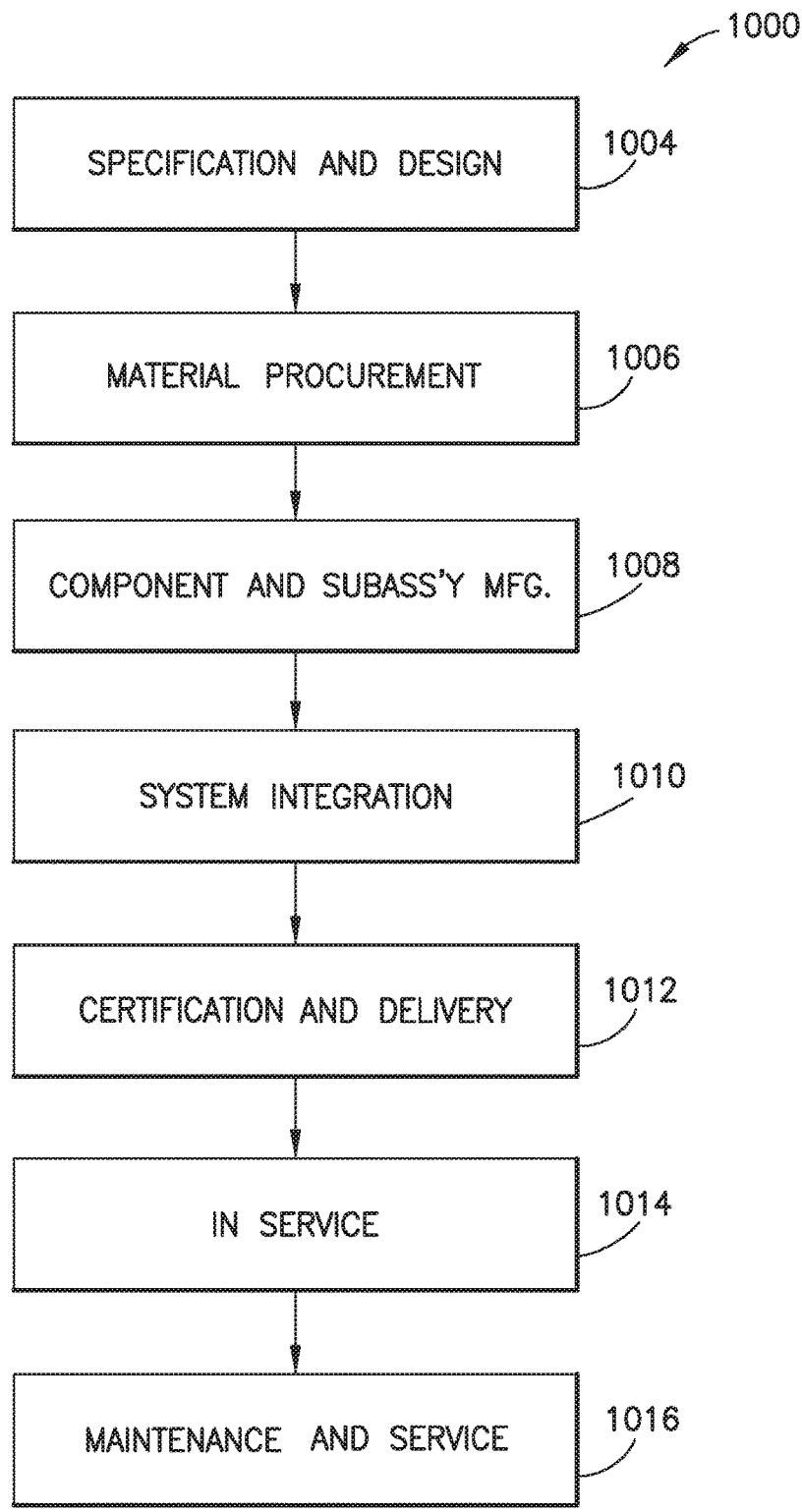

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of a situational awareness system in accordance with one or more aspects of the present disclosure;

FIG. 2 is a schematic illustration of a vertical landing vehicle in accordance with one or more aspects of the present disclosure;

FIG. 3 is a schematic illustration of the vertical landing vehicle in FIG. 2 showing a situational awareness system in accordance with one or more aspects of the present disclosure;

FIGS. 4A-4C are schematic illustrations of the situational awareness system of FIG. 2 in operation on the vertical landing vehicle in accordance with one or more aspects of the present disclosure;

FIGS. 5A-5B are schematic illustrations of the situational awareness system of FIG. 2 in operation on the vertical landing vehicle in accordance with one or more aspects of the present disclosure;

FIGS. 6A-6C are schematic illustrations of a portion of an operator interface in accordance with one or more aspects of the present disclosure;

FIG. 7 is a flow chart of a method of operation of the situational awareness system in accordance with one or more aspects of the present disclosure;

FIG. 8 is a block diagram of aircraft production and service methodology; and

Figure 9:
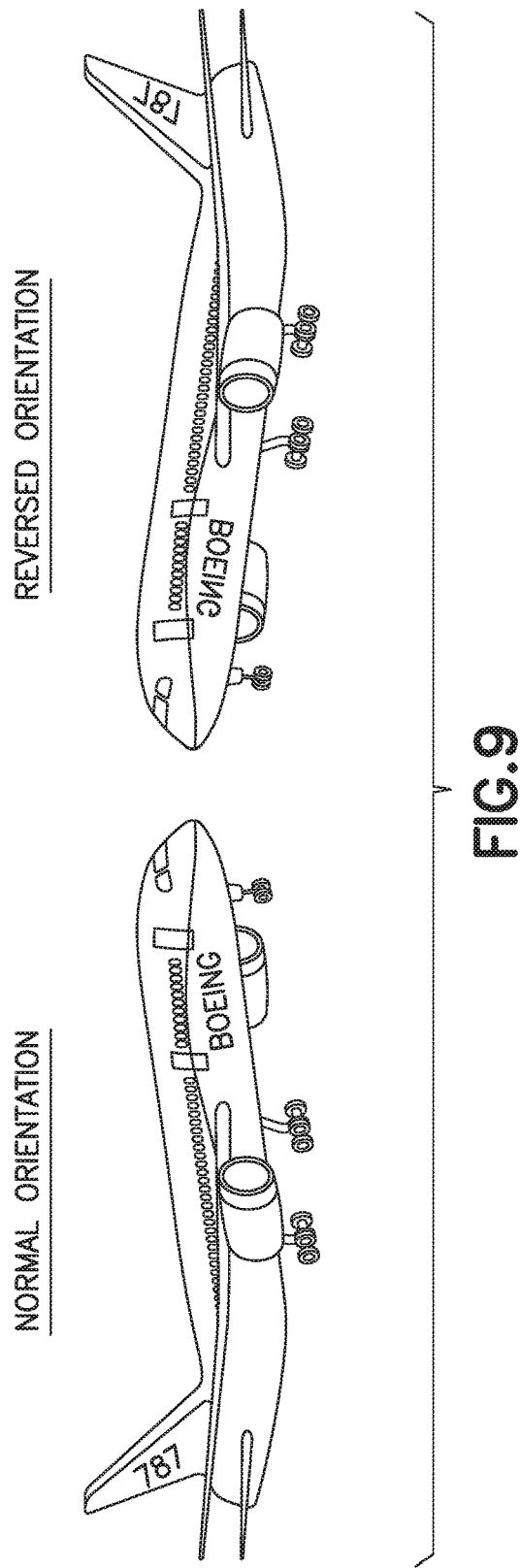

FIG. 9 is an example of an image presented to an operator in a reversed orientation.

DETAILED DESCRIPTION

Referring to FIG. 1, the aspects of the present disclosure described herein provide for a situational awareness system 200, for a vertical landing vehicle 100, which provides situation awareness information 231 including one or more of visual, aural and tactile cueing, to the crew of the vertical landing vehicle 100. The situation awareness information 231 provides, for example, proximity information to the crew while operating the vertical landing vehicle 100 close to, e.g., terrain, ground personnel and slung cargo. In one aspect, the situational awareness system 200 provides, e.g., symbology, as will be further described below, to the crew and/or data to a control system for manual, semi-automatic, or fully automatic operation of the vertical landing vehicle 100 in high workload scenarios and various meteorological and operational environments.

In one aspect, the situational awareness system 200 includes one or more of stereo vision cameras, laser range finders and terrain data, as will be described below, to build unique symbology not currently present on any vertical landing vehicle 100 that eases the workload of the vertical landing vehicle crew and provides at least proximity data to the crew. The use of this data coupled with the control system enables tactile cueing such as, e.g., stick shakes or force feedback/resistance in the flight controls to alert the crew to obstacle(s) 300 (see FIG. 3) adjacent to the vertical landing vehicle 100. Further, when the proximity data is coupled to or otherwise implemented with autonomy protocols, such as automated flight systems, automated or semi-automated landings or hovering of the vertical landing vehicle 100 may be provided during high workload scenarios and various meteorological and operational environments. The situational awareness system 200 may lower crew workload, and increase landing and/or hover accuracy during, e.g., manual, semi-automatic, and fully automatic landings of the vertical landing vehicle 100.

Illustrative, non-exhaustive examples, which may or may not be claimed, of the subject matter according to the present disclosure are provided below.

Referring to FIGS. 1 and 2, the aspects of the present disclosure described herein disclose an exemplary situational awareness system 200. In one aspect, while the situational awareness system 200 described herein is described with respect to a vertical landing vehicle 100, such as a BOEING® CH-47 Chinook, in other aspects the vertical landing vehicle 100 may be any suitable vertical landing fixed wing, tilt-wing, tilt-rotor or rotary wing vehicle, such as, e.g., an AV-8 Harrier jump jet, an F-35B (Joint Strike Fighter), a V-22 Osprey, etc.

In one aspect, the vertical landing vehicle 100 includes an airframe 101 forming a hull 102, and at least one wing 103. In one aspect, the airframe 101 includes, at least, lateral sides 101S1, 101S2, a forward portion 101F, an aft portion 101A, and an underneath portion 101U. In one aspect, the at least one wing 103 is coupled to the airframe 101 and may be a fixed wing or rotary wing. In this aspect, the at least one wing 103 is illustrated as a rotary wing. In one aspect, the vertical landing vehicle 100 may also include one or more of landing gear 104, one or more doors 105 (which may form loading ramps), and/or sling load attachments 106. In one aspect, the landing gear 104 is disposed on the underneath portion 101U of the vertical landing vehicle 100; while in other aspects, the landing gear 104 may be disposed on any suitable portion of the vertical landing vehicle 100 in any suitable manner so that the landing gear extends below the vertical landing vehicle 100 to facilitate landing. In one aspect, the sling load attachment 106 is disposed on the underneath portion 101U of the vertical landing vehicle 100; while in other aspects, the sling load attachment 106 may be disposed in any suitable portion of the vertical landing vehicle 100 in any suitable manner, such as adjacent a door of the vertical landing vehicle 100. In one aspect, one of the one or more doors 105 is coupled to the airframe 101 in, for example, the aft portion 101A of the vertical landing vehicle 100. In one aspect, as noted above, the one or more doors 105 when deployed may form a portion of a loading ramp for crew mounting and dismounting. In one aspect, as will be described herein, the one or more doors 105 may be opened such that only the aft portion 101A is in contact with the ground or other structure (e.g. building, marine vessel, etc.), such as during a pinnacle landing where the forward portion 101F of the vertical landing vehicle 100 remains airborne so that passengers and/or equipment may enter/exit the hull 102 through the one or more doors 105 in substantial contact with the ground or other structure.

Referring still to FIGS. 1 and 2, the aspects of the situational awareness system 200 provide for, e.g., improved accuracy during manual, semi-automatic, or fully automatic operation of the vertical landing vehicle 100; reduced workload for the crew operating the vertical landing vehicle 100; an improved buffer zone for mounting/dismounting passengers during operation of the vertical landing vehicle 100; and/or improved operation during low light or degraded visual environment (DVE). As will be described below, the situational awareness system 200 provides situation awareness information 231, such as by presenting proximity information between the vertical landing vehicle 100 and terrain to an operator 110 (e.g., a crewman or the automated control system) of the vertical landing vehicle 100, so that the operator 110 may guide the vertical landing vehicle 100 during, e.g., landing, load pick up/drop-off, and/or passenger pick up/drop-off. For example, the situation awareness information 231 is presented through one or more of auditory tones, tactile feedback, visual imagery and/or visual symbology rather than verbally from, e.g., a terrain spotting crewman, so as to allow other crew members (such as would-be terrain spotting crewman) to perform other tasks required during landing, load pick up/drop-off, passenger pick up/drop-off, etc. (i.e., the crew may not be needed for, e.g., terrain spotting).

In one aspect, the situational awareness system 200 is integrated into the vertical landing vehicle 100 in any suitable manner and includes at least one proximity sensor 210 coupled to the airframe 101 of the vertical landing vehicle 100. For example, the situational awareness system 200 may be integrated with a flight control system 220 of the vertical landing vehicle 100 that includes a control processor 225 and an operator interface 230 disposed, for example, within the hull 102 of the vertical landing vehicle 100 such as in the cockpit. In one aspect, the control processor 225 may be coupled to the at least one proximity sensor 210 and include suitable non-transitory program code to convert data received from the at least one proximity sensor 210 into the auditory tones, tactile feedback, visual imagery and/or visual symbology as described herein.

Referring now to FIGS. 1 and 3, in one aspect, the at least one proximity sensor 210 includes one or more of a range sensor 210RS, a lidar sensor 210LS, a sonar sensor 210SS, a radar sensor 210RSS, an ultrasonic sensor 210US, video imager(s) 210VS, and/or any other suitable sensor or combination of sensors. In one aspect, the at least one proximity sensor 210 is coupled to the airframe 101 of the vertical landing vehicle 100 in predetermined locations around a perimeter 101P (or hull 102) of the vertical landing vehicle 100, so as to provide situational awareness/detection coverage, as will be further described below, in the predetermined locations. In one aspect, the predetermined locations are locations on the vertical landing vehicle 100 that may contact obstacle(s) 300 adjacent the vertical landing vehicle 100 during operation of the vertical landing vehicle 100. For example, the at least one proximity sensor 210 scans for obstacle(s) 300 a predetermined distance X from the perimeter 101P of the airframe 101 of the vertical landing vehicle 100, near one or more predetermined locations, such as the at least one wing 103, the aft portion 101A, the underneath portion 101U, the forward portion 101F, and/or the sides 101S1, 101S2 of the vertical landing vehicle 100 and provides situational awareness/detection coverage to allow for decreased distances between the vertical landing vehicle 100 and surrounding obstacle(s) 300 and smaller landing zone selection. In one aspect, one or more of the forward portion 101F, the aft portion 101A, the underneath portion 101U and the lateral sides 101S1, 101S2 may include at least one proximity sensor 210. In one aspect, one or more of the forward portion 101F, the aft portion 101A, the underneath portion 101U and the lateral sides 101S1, 101S2 may include multiple proximity sensors 210. In one aspect, one or more of the forward portion 101F, the aft portion 101A, the underneath portion 101U and the lateral sides 101S1, 101S2 may include any suitable combination of proximity sensors 210 (i.e., one portion may have one proximity sensor while another portion has multiple proximity sensors—one portion may have laser/sonic sensors while another portion has imaging sensors, etc.).

In one aspect, still referring to FIGS. 1 and 3, the at least one proximity sensor 210 is fixed and provides a predetermined sensor field of view SFOV, within which one or more of the hull 102, the landing gear 104, the one or more doors 105, the sling load attachments 106 and/or the at least one wing 103 are disposed. For example, in one aspect as will be described herein with respect to FIGS. 3 and 4A-4C, the at least one proximity sensor 210 includes at least one forward facing sensor 210F, at least one aft facing sensor 210A and lateral facing sensors 210L that are in fixed locations on the hull 102 and substantially parallel with the at least one wing 103 so that, for example, a rotor disc 103RD of the at least one wing 103 is disposed within the field of view SFOV of each of the sensors 210A, 210F, 210L. Here, an obstacle 300 detected within the substantially parallel sensor field of view SFOV provided by each of the sensors 210A, 210F, 210L will be presented to the operator 110 of the vertical landing vehicle 100 through the situational awareness information 231 to inform the operator 110 that the obstacle 300 is nearing or adjacent to the at least one wing 103. In one aspect, field of view SFOV of the at least one sensor 210 may be a volumetric field of view as illustrated in FIGS. 4A-4C and 5A-5B so that any tilting of the rotor disc 103RD relative to the fixed position of the at least one sensor on the hull 102 is within the sensor field of view SFOV and so that obstacles are detected in multiple directions relative to the vertical landing vehicle 100. In one aspect, the at least one proximity sensor 210 may be gimballed and the sensor field of view SFOV may be adjustable. For example, the at least one proximity sensor 210 may be gimballed with respect to a plane 103PL (FIG. 4A) defined by, e.g., the rotor disc 103RD of the at least one wing 103 so that as the vertical landing vehicle 100 pitches or the rotor disc 103RD is tilted the at least one proximity sensor 210 adjusts to compensate for the pitch or tilt.

As noted above, in one aspect, referring to FIGS. 1 and 3, the at least one proximity sensor 210 is positioned on the airframe 101 of the vertical landing vehicle 100 to detect obstacle(s) 300 such as, e.g., terrain, stationary or moving ground personnel, etc., so that situational awareness information 231 corresponding to the obstacle(s) 300 may be provided or otherwise presented to the operator 110 of the vertical landing vehicle 100 for maneuvering the vertical landing vehicle 100 around the obstacle(s) 300 detected by the at least one proximity sensor 210. In one aspect, the at least one proximity sensor 210 senses obstacle(s) 300 around a perimeter 101P of the airframe 101. As noted above, in one aspect, the sensor field of view SFOV of the at least one proximity sensor 210 spans a predetermined distance X from the perimeter 101P of the airframe 101. In one aspect, the at least one proximity sensor 210 senses obstacle(s) 300 around a perimeter 103P (e.g. formed by the rotor disc 103RD) of the at least one wing 103. In one aspect, the sensor field of view SFOV of the at least one proximity sensor 210 extends a predetermined distance Y outward from the perimeter 103P of the at least one wing 103. The predetermined distances X, Y of the sensor field of view SFOV provide the operator 110 with situational awareness of a clearance distance to obstacle(s) 300 allowing the operator 110 to operate in, e.g., smaller landing zones and around the obstacle(s) 300. For example, in one aspect, the obstacle(s) 300 may be disposed outside of a field of view FOV or line of sight of the operator 110 of the vertical landing vehicle 100 (i.e., the operator 110 does not have a clear line of sight to view obstacles and would require the aid of another crew member to audibly relay the location and distance of the obstacle). Here, the at least one proximity sensor 210 may provide the operator 110 with situational awareness of any obstacle(s) 300 within the sensor field of view SFOV which is outside of the operator's field of view FOV. In one aspect, the obstacle(s) 300 may be moving (e.g., waving trees, mobile vehicles, etc.) such that the distances between, e.g., the hull 102 and the obstacle(s) 300 are dynamic. In this aspect, real time updates from the at least one proximity sensor 210 provides a constantly updated sensor field of view SFOV of the at least one proximity sensor 210 to cover the obstacle(s) 300 moving into and out of the field of view FOV of the operator 110 and/or the sensor field of view SFOV of the at least one proximity sensor 210.

Referring now to FIGS. 1-3, in one aspect, as noted above, the at least one proximity sensor 210 is disposed so as to detect obstacle(s) 300 within a respective sensor field of view SFOV of each proximity sensor 210. In one aspect, the sensor field of view SFOV is forward of the hull 102 (i.e., in front of the forward portion 101F of the vertical landing vehicle 100—see sensor 210F (see FIG. 2)). In one aspect, the sensor field of view SFOV forward of the hull 102 may overlap or include the operator 110 field of view FOV. In one aspect, the sensor field of view SFOV is aft of the hull 102 (i.e., behind the aft portion 101A of the vertical landing vehicle 100—see sensor 210A and the sensor field of view illustrated in FIGS. 4A-4C) and provides the operator 110 with situational awareness information 231 of any obstacle(s) 300 located aft of the vertical landing vehicle 100. In one aspect, the sensor field of view SFOV is underneath the hull 102 (i.e., below the underneath portion 101U of the vertical landing vehicle 100 as illustrated in FIGS. 2, 5A and 5B where the sensor field of view SFOV of sensor 210B is below the hull 102 and may also project forward or aft of the vertical landing vehicle 100) and provides the operator 110 with situational awareness information 231 of any obstacle(s) 300 located underneath the hull 102, such as near the landing gear 104 and/or the sling load attachment 106. In one aspect, the sensor field of view SFOV is on one or more lateral sides 101S1, 101S2 of the hull 102 (see sensors 210L in FIG. 2) and provides the operator 110 with situational awareness information 231 of any obstacle(s) 300 located near the lateral sides 101S1, 101S2. In one aspect, the sensor field of view SFOV encompasses one or more of the previously mentioned predetermined locations or any suitable combination of these locations. In one aspect, the one or more sensor field of view SFOV of the at least one sensor 210 may overlap with each other (see the sensor field of view SFOV of the respective sensors 210A, 210F, 210L as illustrated in FIG. 3)

so as to provide substantially 360 degrees of obstacle detection/sensor coverage about the perimeter 101P of the airframe 101 and/or the perimeter 103P of the at least one wing 103 of the vertical landing vehicle 100.

Referring now to FIGS. 1, 2, 4A-4C, and 5A-5B, in one aspect, the situational awareness information 231 obtained by the at least one proximity sensor 210, for example illustrated as a radar or sonar sensor in FIGS. 4A-4C and as a stereo camera sensing system in FIGS. 5A-5B, includes, in one aspect, distance data DD (see FIG. 1) indicating a distance between one or more obstacle(s) 300 and any suitable portion of the vertical landing vehicle 100, such as the plane 103PL of the at least one wing 103, the hull 102, the landing gear 104, the sling load attachments 106 and/or the at least one door 105. For example, in one aspect, the distance data DD indicates a distance 103D (see FIGS. 4A-4C) between obstacle(s) 300 and the plane 103PL of the at least one wing 103. In one aspect, the situational awareness information 231 obtained by the at least one proximity sensor 210 includes distance data DD located in the sensor field of view SFOV of the at least one proximity sensor 210 indicating a distance 104D (see FIGS. 4A-4C and 5A) between obstacle(s) 300 and landing gear 104 of the vertical landing vehicle 100 (such sensor field of view SFOV is provided by the proximity sensor 210B on the underneath portion 101U of the hull 102). In one aspect, the situational awareness information 231 obtained by the at least one proximity sensor 210 includes distance data DD located in the sensor field of view SFOV of the at least one proximity sensor 210 indicating a distance 102D (see FIGS. 4A and 4B) between obstacle(s) 300 and the hull 102 of the vertical landing vehicle 100. In one aspect, the situational awareness information 231 obtained by the at least one proximity sensor 210 includes distance data DD located in the sensor field of view SFOV of the at least one proximity sensor 210 indicating a distance 105D (see FIGS. 4A, 4B, 4C and 5A) between obstacle(s) 300 and the one or more doors 105 of the vertical landing vehicle 100. In one aspect, the situational awareness information 231 obtained by the at least one proximity sensor 210 (such as proximity sensor 210B) includes distance data DD located in the sensor field of view SFOV of the at least one proximity sensor 210 indicating a distance 106D (see FIG. 5A) between obstacle(s) 300 and the sling load attachments 106 of the vertical landing vehicle 100. In one aspect, the distances 102D, 103D, 104D, 105D, 106D are displayed to the operator 110 of the vertical landing vehicle 100 through the operator interface 230 as will be described below.

Referring now also to FIGS. 6A-6C, in one aspect, the flight control system 220 is a manual control system. In one aspect the flight control system 220 is a digital automatic flight control system, which may provide the vertical landing vehicle 100 with semi-automatic or fully automatic flight. In one aspect, the flight control system 220 is coupled to and in communication with the at least one proximity sensor 210. In one aspect, the control processor 225 of the flight control system 220 is coupled to and in communication with the at least one proximity sensor 210, such that the control processor 225 receives proximity signals 211 (see FIG. 1) from the at least one proximity sensor 210. In one aspect, the situational awareness information 231 is based on the proximity signals 211 (see FIG. 1) generated by the at least one proximity sensor 210 upon detection of one or more obstacle(s) 300. In one aspect, the flight control system 220 includes any suitable terrain data 232 and the control processor 225 is configured to fuse the terrain data 232 with the proximity signals 211 to provide the operator 110 of the vertical landing vehicle 100 with situational awareness information based on the fused data as illustrated in FIGS. 6A-6C where distance data DD (see FIG. 1) obtained by the at least one proximity sensor 210 is overlaid or fused with terrain data 232 (see FIG. 1) to provide the operator 110 with, for example, a three-dimensional perspective, relative to the vertical landing vehicle 100, of the obstacle(s) 300 and the terrain on which the obstacle(s) 300 are located. In one aspect, referring to FIG. 1, the control processor 225 may be a microprocessor, a microcontroller, any suitable flight control processor of the vertical landing vehicle 100. In one aspect, such as where the flight control system 220 is fully automatic, the control processor 225 is configured to control a landing approach or hovering of the vertical landing vehicle 100 depending on the situational awareness information 231 received from the at least one proximity sensor 210 and/or the terrain data 232.

In one aspect, still referring to FIGS. 1, 2, 4A-4C, 5A-5B, and 6A-6C, the control processor 225 is coupled to and in communication with the operator interface 230 (see FIGS. 1 and 6A-6C). In one aspect, the operator interface 230 is a visual interface 230V such as a graphical user interface, a text-based user interface, a display device, or any other suitable visual interface. In one aspect, the operator interface 230 is an aural interface 230A such as speakers, piezo buzzers, siren, or any other suitable audio interface. In one aspect, the operator interface 230 is a tactile interface 230T that may include a portion of the flight control system, such as, for example illustrated in FIG. 2, a cyclic stick CS, flight control pedals PD, or any other suitable tactile interface, that provides tactile feedback to the operator such as through vibration VB or force feedback FB (e.g. resistance to operator control input, which may be overcome by the operator). In one aspect, the operator interface 230 may be any suitable interface or any suitable combination of the visual, aural and tactile interfaces 230V, 230A, 230T described above.

In one aspect, the control processor 225 and the operator interface 230 are disposed in the vertical landing vehicle 100 as a single unit, such as, for example, in an instrument panel, an electronic instrument cluster or a HUD. In one aspect, the control processor 225 presents through the operator interface 230, the situational awareness information 231 based on the proximity signals 211 received from the at least one proximity sensor 210. In one aspect, the control processor 225 presents the situational awareness information 231, through the operator interface 230, as one or more of a visual feedback 230VD, tactile feedback 230TD and/or an aural feedback 230AD. In one aspect, the visual feedback 230VD, the tactile feedback 230TD and/or the aural feedback 230AD represent one or more of the distances 102D, 103D, 104D, 105D, 106D between one or more of the hull 102, at least one wing 103, landing gear 104, one or more doors 105, and sling load attachments 106 and the terrain or obstacle(s) 300 adjacent the vertical landing vehicle 100. For example, as seen in FIGS. 6A and 6C, the control processor 225 presents the situational awareness information 231, through the operator interface 230, as an image that includes, for example, the sensor field of view SFOV (such as from sensors 210A and/or 210B illustrated in FIGS. 4A-4C and 5A-5B), one or more of the hull 102, the at least one wing 103, and one or more door 105 with a terrain map overlay 600. In one aspect, as seen in FIGS. 6A-6C, the image also includes one or more range indications 601, 602, 603 which indicate a distance between one or more of the hull 102, the at least one wing 103, the landing gear 104, the one or more doors 105, and/or the sling load attachments 106 and, e.g., terrain or obstacles 300 adjacent the vertical landing vehicle 100. In one aspect, the terrain map overlay 600 may display distance ranges as different colors where each color indicates proximity between the obstacle(s) 300 and the vertical landing vehicle 100. For example, an obstacle 300 may be presented to the operator 110 as red indicating that the obstacle 300 is located within a distance range DS1 between the hull 102 and range indication 601 (i.e., the obstacle 300 is in close proximity to the hull 102). An obstacle presented to the operator 110 as, for example yellow indicates the obstacle is at least outside the distance range DS1 but within the distance range DS2 relative to the vertical landing vehicle 100 (e.g., the object is located between range indication 601 and range indication 602). An obstacle 300 presented to the operator 110 as, for example, green indicates that the obstacle 300 is at least outside distance range DS2 and located up to an edge or limit 603 of the sensor field of view SFOV distance range DS3 relative to the hull 102 (e.g., located a distance that is further than range indication 602).

In one aspect, different audible tones may be associated with the different distance ranges DS1, DS2, DS3 in addition to or in lieu of the visual feedback 230VD and tactile feedback 230TD. For example, when obstacle(s) 300 (which may include terrain) are detected within distance range DS3 a first auditory tone having a first characteristic may be presented to the operator 110 in any suitable manner. In one aspect, the first auditory characteristic may be a volume of the tone, a frequency of the tone, a pitch of the tone, etc. When obstacle(s) 300 are detected within the distance range DS2 a second auditory tone having a second auditory characteristic, different than the first auditory characteristic, may be presented to the operator 110 in any suitable manner. For example, the second auditory characteristic may be presented with an increased volume, an increased frequency, a higher pitch, etc. than the first auditor tone. When obstacle(s) 300 are detected within the distance range DS1 a third auditory tone having a third auditory characteristic, different than both the first auditory characteristic and the second auditory characteristic, may be presented to the operator 110 in any suitable manner. For example, the third auditory characteristic may be presented with an increased volume, an increased frequency, a higher pitch, etc. than both the first auditor tone and the second auditory tone.

In one aspect, as seen best in FIGS. 6B and 6C, the control processor 225 may present the situational awareness information 231 detected from, a proximity sensor 210B (see FIGS. 2, 5A and 5B) disposed on the underneath portion 101U of the vertical landing vehicle 100. In one aspect the sensor proximity 210B disposed on the underneath of the vertical landing vehicle 100 is a video imager 210VS (see FIG. 1) such as a stereo camera system that provides both an image of the terrain/obstacles 300 as well as distance data DD corresponding to the terrain/obstacles 300. For example the sensor field of view SFOV of proximity sensor 210B depicted in FIGS. 5A and 5B illustrates a field of view of the video imager 210VS (see FIG. 1), and may be presented to the operator 110 through the operator interface 230, as an image of the underneath portion 101U (for example, seen in FIGS. 6B and 6C) of the vertical landing vehicle 100 where the image includes range indications 601-603 (in a manner similar to that described above). In one aspect, the image presented to the operator 110 may have a normal orientation. In one aspect, the image presented to the operator 110 may have a reversed orientation, such as through, e.g., video processing hardware as illustrated in FIG. 9. In one aspect, the image further includes range indication 604 (see, FIG. 6B) particular to obstacle(s) 300 within the sensor field of view SFOV. For example, in one aspect, range indication 604 may indicate a distance between one or more of the landing gear 104, the hull 102 and/or the sling load attachments 106 and, e.g., terrain or obstacle(s) 300 adjacent the vertical landing vehicle 100. In one aspect, the range indication 604 may be a static indication relative to the vertical landing vehicle 100, similar to a range finder target where the operator 110 may position a range finding target 604T1, 604T2 by maneuvering the vertical landing vehicle 100 to position the range finding target 604T1, 604T2 over any desired object 300 within the sensor field of view SFOV to determine a distance to the object 300 relative to one or more of, e.g., the landing gear 104, the hull 102 and the sling load attachment 106. In one aspect, the range indication may be a selectable range finding target 604S (i.e., if the operator 110 selects an obstacle 300, the selectable range indication 604S appears on that obstacle and presents the distance between the obstacle any suitable portion of the vertical landing vehicle 100 in a manner similar to that described above). In one aspect, obstacle(s) 300 that appear within the sensor field of view SFOV may be automatically detected and selected by the situational awareness system 200 where the range indication 604S is presented on top of or overlaid on the object with a distance indication to that object (either by presenting the object in a predetermined color as noted above or by providing a numerical distance to the object 300).

Referring again to FIGS. 1 and 2, in one aspect, the control processor 225 presents the situational awareness information 231, through the operator interface 230, as tactile feedback on a flight control of the vertical landing vehicle 100. In one aspect, the tactile feedback includes one or more of resistance or force feedback FB to operator input on and/or vibrating/shaking VB of one or more of the flight controls, for example, the cyclic stick CS, the pedals PD, eye trackers, three-axis side sticks, or any other suitable pilot controls. This tactile feedback may be presented along with the visual and/or aural feedback as described above.

Referring now to FIG. 7, a method of operation 700 of the situational awareness system 200 is illustrated. In one aspect, at least one proximity sensor 210 is coupled to the airframe 101 of the vertical landing vehicle 100 (FIG. 7, Block 701). In one aspect, the at least one proximity sensor 210 is coupled and positioned to obtain obstacle information outside a field of view FOV of an operator of the vertical landing vehicle 100. In one aspect, as the operator 110 of the vertical landing vehicle 100 is taxiing, landing, or otherwise in flight, the at least one proximity sensor 210 detects obstacle(s) 300 disposed within the respective sensor field of view SFOV (FIG. 7, Block 702). The at least one proximity sensor 210 sends proximity signals 211, related to the obstacle(s) 300, to the control processor 225 (FIG. 7, Block 703). In one aspect, the control processor 225 receives the proximity signals 211 from the at least one proximity sensor 210 (FIG. 7, Block 704). In one aspect, the control processor fuses, terrain data 232 with the proximity signals 211 to form the situational awareness information 231. In one aspect, the control processor 225 presents, through the operator interface 230 of the flight control system 220, based on the proximity signals 211, the situational awareness information 231 of obstacle(s) 300 within a predetermined distance 102D, 103D, 104D, 105D, 106D of the vertical landing vehicle 100 relative to one or more of the hull 102, the at least one wing 103, the landing gear 104, the one or more doors 105, and/or the sling load attachments 106 (FIG. 7, Block 705). In one aspect, the situational awareness information 231 is presented through the operator interface 230 as one or more of visual feedback and/or aural feedback. In one aspect, the situational awareness information 231 is presented through the operator interface 230 as an image of a portion of the hull 102 and/or a portion of the at least one wing 103 with a terrain map overlay 600 including distance indications 102D between the vertical landing vehicle 100 and terrain/obstacle(s) 300 adjacent the vertical landing vehicle 100. In one aspect, the situational awareness information 231 is presented through the operator interface 230, as tactile feedback 230TD, visual feedback 230VD and/or aural feedback 230AD as described above.

Examples of the present disclosure may be described in the context of aircraft manufacturing and service method 1000 as shown in FIG. 8. In other aspects, the examples of the present disclosure may be applied to any other suitable vehicle, such as e.g. unmanned aerial vehicles With respect to aircraft manufacturing, during pre-production, illustrative method 1000 may include specification and design (block 1004) of vertical landing vehicle 100 and material procurement (block 1006). During production, component and subassembly manufacturing (block 1008) and system integration (block 1010) of vertical landing vehicle 100 may take place. Thereafter, vertical landing vehicle 100 may go through certification and delivery (block 1012) to be placed in service (block 1014). While in service, aircraft 1102 may be scheduled for routine maintenance and service (block 1016). Routine maintenance and service may include modification, reconfiguration, refurbishment, etc. of one or more systems of vertical landing vehicle 100 which may include the situational awareness system 200 as described herein.

Each of the processes of illustrative method 1000 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of the manufacturing and service method 1000. For example, components or subassemblies corresponding to component and subassembly manufacturing (block 1008) may be fabricated or manufactured in a manner similar to components or subassemblies produced while aircraft 1102 is in service (block 1014). Also, one or more examples of the apparatus(es), method(s), or combination thereof may be utilized during production stages 1008 and 1010, for example, by substantially expediting assembly of or reducing the cost of vertical landing vehicle 100. Similarly, one or more examples of the apparatus or method realizations, or a combination thereof, may be utilized, for example and without limitation, while aircraft 1102 is in service (block 1014) and/or during maintenance and service (block 1016).

The following are provided in accordance with the aspects of the present disclosure:

A1. A vertical landing vehicle comprising:
an airframe forming a hull and having at least one wing coupled to the airframe;
at least one proximity sensor coupled to the airframe; and
a flight control system including a control processor and an operator interface, the at least one proximity sensor being coupled to the control processor, the control processor being configured to receive proximity signals from the at least one proximity sensor and present, through the operator interface and based on the proximity signals, situational awareness information of obstacles within a predetermined distance of the vertical landing vehicle relative to the hull and the at least one wing.

A2. The vertical landing vehicle of paragraph A1, wherein the at least one wing comprises one or more of a fixed wing and a rotary wing.

A3. The vertical landing vehicle of paragraph A1, wherein the vertical landing vehicle comprises one of a fixed wing aircraft, a tilt-wing aircraft, a tilt-rotor aircraft and a rotary wing aircraft.

A4. The vertical landing vehicle of paragraph A1, wherein the at least one proximity sensor comprises one or more of a terrain sensor, an obstacle sensor, a radar sensor, a video imager, and/or a sonic sensor.

A5. The vertical landing vehicle of paragraph A1, wherein the situational awareness information includes distance data indicating a distance between obstacles and the vertical landing vehicle.

A6. The vertical landing vehicle of paragraph A1, wherein the situational awareness information includes distance data indicating a distance between obstacles and a plane defined by a rotor disc of the at least one wing.

A7. The vertical landing vehicle of paragraph A1, wherein the situational awareness information includes a distance between obstacles and landing gear of the vertical landing vehicle.

A8. The vertical landing vehicle of paragraph A1, wherein the situational awareness information includes a distance between obstacles and the hull of the vertical landing vehicle.

A9. The vertical landing vehicle of paragraph A1, wherein the at least one proximity sensor senses obstacles disposed forward of the hull.

A10. The vertical landing vehicle of paragraph A1, wherein the at least one proximity sensor senses obstacles disposed aft of the hull.

A11. The vertical landing vehicle of paragraph A1, wherein the at least one proximity sensor senses obstacles disposed underneath the hull.

A12. The vertical landing vehicle of paragraph A1, wherein the at least one proximity sensor senses obstacles disposed on one or more sides of the hull.

A13. The vertical landing vehicle of paragraph A1, wherein the at least one proximity sensor is positioned to obtain obstacle information where the obstacles are disposed outside a field of view of an operator of the vertical landing vehicle.

A14. The vertical landing vehicle of paragraph A1, wherein the control processor is configured to present the situational awareness information, through the operator interface, as one or more of visual and aural feedback.

A15. The vertical landing vehicle of paragraph A14, wherein the one or more of the visual and the aural feedback represent a distance between at least the hull and terrain or obstacles adjacent the vertical landing vehicle.

A16. The vertical landing vehicle of paragraph A15, wherein the one or more of the visual and the aural feedback further represent a distance between the at least one wing and the terrain or the obstacles adjacent the vertical landing vehicle.

A17. The vertical landing vehicle of paragraph A1, wherein the control processor is configured to present the situational awareness information, through the operator interface, as an image of the hull with a terrain map overlay including range indications between at least the hull and terrain adjacent the vertical landing vehicle.

A18. The vertical landing vehicle of paragraph A17, wherein the range indications further include distance indications between the at least one wing and the terrain.

A19. The vertical landing vehicle of paragraph A17, wherein the image of the hull includes an image of landing gear of the vertical landing vehicle.

A20. The vertical landing vehicle of paragraph A17, wherein the image of the hull includes an image of one or more doors or access ramps coupled to the hull.

A21. The vertical landing vehicle of paragraph A17, wherein the image of the hull includes an image of sling load attachments coupled to the airframe.

A22. The vertical landing vehicle of paragraph A1, wherein control processor is configured to present the situational awareness information, through the operator interface, as tactile feedback on a flight control of the vertical landing vehicle.

A23. The vertical landing vehicle of paragraph A22, wherein the tactile feedback comprises resistance to operator input on one or more of the flight controls.

A24. The vertical landing vehicle of paragraph A22, wherein the tactile feedback comprises vibrating or shaking of the flight control.

A25. The vertical landing vehicle of paragraph A1, wherein the flight control system comprises an automatic flight control system and the control processor is configured to control a landing approach or hovering of the vertical landing vehicle depending on the proximity signals received from the at least one proximity sensor.

A26. The vertical landing vehicle of paragraph A1, wherein the flight control system includes terrain data and the control processor is configured to fuse the terrain data with the proximity signals to form the situational awareness information.

B1. A situational awareness system for a vertical landing vehicle having an airframe forming a hull and having at least one wing coupled to the airframe, the situational awareness system comprising:

at least one proximity sensor coupled to the airframe, the at least one proximity sensor being configured to sense obstacles around a perimeter of one or more of the hull and the at least one wing; and a flight control system including a control processor and an operator interface, the at least one proximity sensor being coupled to the control processor, the control processor being configured to receive proximity signals from the at least one proximity sensor and present, through the operator interface and based on the proximity signals, situational awareness information of obstacles within a predetermined distance of the perimeter of the one or more of the hull and the at least one wing.

B2. The situational awareness system of paragraph B1, wherein the at least one wing comprises one or more of a fixed wing and a rotary wing.

B3. The situational awareness system of paragraph B1, wherein the vertical landing vehicle comprises one of a fixed wing aircraft, a tilt-wing aircraft, a tilt-rotor aircraft and a rotary wing aircraft.

B4. The situational awareness system of paragraph B1, wherein the at least one proximity sensor comprises one or more of a terrain sensor, an obstacle sensor, a radar sensor, a video imager, and a sonic sensor.

B5. The situational awareness system of paragraph B1, wherein the situational awareness information includes distance data indicating a distance between obstacles and the vertical landing vehicle.

B6. The situational awareness system of paragraph B1, wherein the situational awareness information includes distance data indicating a distance between obstacles and a plane defined by a rotor disc of the at least one wing.

B7. The situational awareness system of paragraph B1, wherein the situational awareness information includes a distance between obstacles and landing gear of the vertical landing vehicle.

B8. The situational awareness system of paragraph B1, wherein the situational awareness information includes a distance between obstacles and the hull of the vertical landing vehicle.

B9. The situational awareness system of paragraph B1, wherein the at least one proximity sensor senses obstacles disposed forward of the hull.

B10. The situational awareness system of paragraph B1, wherein the at least one proximity sensor senses obstacles disposed aft of the hull.

B11. The situational awareness system of paragraph B1, wherein the at least one proximity sensor senses obstacles disposed underneath the hull.

B12. The situational awareness system of paragraph B1, wherein the at least one proximity sensor senses obstacles disposed on one or more sides of the hull.

B13. The situational awareness system of paragraph B1, wherein the at least one proximity sensor is positioned to obtain obstacle information where the obstacles are disposed outside a field of view of an operator of the vertical landing vehicle.

B14. The situational awareness system of paragraph B1, wherein the control processor is configured to present the situational awareness information, through the operator interface, as one or more of visual and aural feedback.

B15. The situational awareness system of paragraph B14, wherein the one or more of the visual and the aural feedback represent a distance between at least the hull and terrain or obstacles adjacent the vertical landing vehicle.

B16. The situational awareness system of paragraph B15, wherein the one or more of the visual and the aural feedback further represent a distance between the at least one wing and the terrain or the obstacles adjacent the vertical landing vehicle.

B17. The situational awareness system of paragraph B1, wherein the control processor is configured to present the situational awareness information, through the operator interface, as an image of the hull with a terrain map overlay including range indications between at least the hull and terrain adjacent the vertical landing vehicle.

B18. The situational awareness system of paragraph B17, wherein the range indications further include distance indications between the at least one wing and the terrain.

B19. The situational awareness system of paragraph B17, wherein the linage of the hull includes an image of landing gear of the vertical landing vehicle.

B20. The situational awareness system of paragraph B17, wherein the image of the hull includes an image of one or more doors or access ramps coupled to the hull.

B21. The situational awareness system of paragraph B17, wherein the image of the hull includes an image of sling load attachments coupled to the airframe.

B22. The situational awareness system of paragraph B1, wherein control processor is configured to present the situational awareness information, through the operator interface, as tactile feedback on a flight control of the vertical landing vehicle.

B23. The situational awareness system of paragraph B22, wherein the tactile feedback comprises resistance to operator input on the flight control.

B24. The situational awareness system of paragraph B22, wherein the tactile feedback comprises vibrating or shaking of the flight control.

B25. The situational awareness system of paragraph B1, wherein the flight control system comprises an automatic flight control system and the control processor is configured to control a landing approach or hovering of the vertical landing vehicle depending on the proximity signals received from the at least one proximity sensor.

B26. The situational awareness system of paragraph B1, wherein the flight control system includes terrain data and the control processor is configured to fuse the terrain data with the proximity signals to form the situational awareness information.

C1. A method for providing situational awareness to an operator of a vertical landing vehicle, the method comprising:
coupling at least one proximity sensor to an airframe of the vertical landing vehicle, the airframe forming a hull and having at least one wing coupled to the airframe;
receiving proximity signals from the at least one proximity sensor with a control processor of a flight control system of the vertical landing vehicle; and
presenting with the control processor, through an operator interface of the flight control system and based on the proximity signals, situational awareness information of obstacles within a predetermined distance of the vertical landing vehicle relative to the hull and the at least one wing.

C2. The method of paragraph C1, wherein the at least one wing comprises one or more of a fixed wing and a rotary wing.

C3. The method of paragraph C1, wherein the vertical landing vehicle comprises one of a fixed wing aircraft, a tilt-wing aircraft, a tilt-rotor aircraft and a rotary wing aircraft.

C4. The method of paragraph C1, wherein the at least one proximity sensor comprises one or more of a terrain sensor, an obstacle sensor, a radar sensor, a video imager, and a sonic sensor.

C5. The method of paragraph C1, wherein the situational awareness information includes distance data indicating a distance between obstacles and a plane defined by a rotor disc of the at least one wing.

C6. The method of paragraph C1, wherein the situational awareness information includes a distance between obstacles and landing gear of the vertical landing vehicle.

C7. The method of paragraph C1, wherein the situational awareness information includes a distance between obstacles and the hull of the vertical landing vehicle.

C8. The method of paragraph C1, further comprising sensing obstacles disposed forward of the hull with the at least one proximity sensor.

C9. The method of paragraph C1, further comprising sensing obstacles disposed aft of the hull with the at least one proximity sensor.

C10. The method of paragraph C1, further comprising sensing obstacles disposed underneath the hull with the at least one proximity sensor.

C11. The method of paragraph C1, further comprising sensing obstacles disposed on one or more sides of the hull with the at least one proximity sensor.

C12. The method of paragraph C1, wherein coupling the at least one proximity sensor includes positioning the at least proximity sensor to obtain obstacle information where the obstacles are disposed outside a field of view of an operator of the vertical landing vehicle.

C13. The method of paragraph C1, further comprising presenting the situational awareness information, through the operator interface, as one or more of visual and aural feedback.

C14. The method of paragraph C13, wherein the one or more of the visual and the aural feedback represent a distance between at least the hull and terrain or obstacles adjacent the vertical landing vehicle.

C15. The method of paragraph C14, wherein the one or more of the visual and the aural feedback further represent a distance between the at least one wing and the terrain or the obstacles adjacent the vertical landing vehicle.

C16. The method of paragraph C1, further comprising presenting the situational awareness information, through the operator interface, as an image of the hull with a terrain map overlay including range indications between at least the hull and terrain adjacent the vertical landing vehicle.

C17. The method of paragraph C16, wherein the range indications further include distance indications between the at least one wing and the terrain.

C18. The method of paragraph C16, wherein the image of the hull includes an image of landing gear of the vertical landing vehicle.

C19. The method of paragraph C16, wherein the image of the hull includes an image of one or more doors or access ramps coupled to the hull.

C20. The method of paragraph C16, wherein the image of the hull includes an image of sling load attachments coupled to the airframe.

C21. The method of paragraph C1, further comprising presenting the situational awareness information, through the operator interface, as tactile feedback on a flight control of the vertical landing vehicle.

C22. The method of paragraph C21, wherein the tactile feedback comprises resistance to operator input on one or more of the flight controls.

C23. The method of paragraph C21, wherein the tactile feedback comprises vibrating or shaking of the flight control.

C24. The method of paragraph C1, wherein the flight control system comprises an automatic flight control system and the method further comprises controlling, with the control processor, a landing approach or hovering of the vertical landing vehicle depending on the proximity signals received from the at least one proximity sensor.

C25. The method of paragraph C1, further comprising, with the control processor, fusing terrain data terrain data with the proximity signals to form the situational awareness information.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 1, 7 and 8, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 1, 7 and 8 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A vertical landing vehicle comprising:
    an airframe forming a hull and having at least one wing coupled to the airframe;
    at least one proximity sensor coupled to the airframe so that at least a portion of the airframe is disposed within a field of view of a respective one of the at least one proximity sensor so that the portion of the airframe is sensed by the at least one proximity sensor; and
    a flight control system including a control processor and an operator interface, the at least one proximity sensor being coupled to the control processor, the control processor being configured to receive proximity signals from the at least one proximity sensor and generate so as to present, through the operator interface and based on the proximity signals, situational awareness information of obstacles within a respective predetermined distance of the vertical landing vehicle relative to the hull and the at least one wing, wherein a positional relationship between the portion of the airframe and the obstacles, as both the portion of the airframe and the obstacles are sensed by the at least one proximity sensor, is presented as part of the situational awareness information.

2. The vertical landing vehicle of claim 1, wherein the at least one wing comprises one or more of a fixed wing and a rotary wing.

3. The vertical landing vehicle of claim 1, wherein the at least one proximity sensor comprises one or more of a terrain sensor, an obstacle sensor, a radar sensor, a video imager, and a sonic sensor.

4. The vertical landing vehicle of claim 1, wherein the situational awareness information includes distance data indicating a distance between obstacles and the vertical landing vehicle.

5. The vertical landing vehicle of claim 1, wherein the control processor is configured to present the situational awareness information, through the operator interface, as one or more of visual and aural feedback.

6. The vertical landing vehicle of claim 5, wherein the one or more of the visual and the aural feedback represent a distance between at least the hull and terrain or obstacles adjacent the vertical landing vehicle.

7. The vertical landing vehicle of claim 1, wherein control processor is configured to present the situational awareness information, through the operator interface, as tactile feedback on a flight control of the vertical landing vehicle.

8. The vertical landing vehicle of claim 1, wherein the flight control system comprises an automatic flight control system and the control processor is configured to control a landing approach or hovering of the vertical landing vehicle depending on the proximity signals received from the at least one proximity sensor.

9. The vertical landing vehicle of claim 1, wherein the flight control system includes terrain data and the control processor is configured to fuse the terrain data with the proximity signals to form the situational awareness information.

10. A situational awareness system for a vertical landing vehicle having an airframe forming a hull and having at least one wing coupled to the airframe, the situational awareness system comprising:
at least one proximity sensor coupled to the airframe, the at least one proximity sensor being positioned relative to the airframe and configured to sense both of at least a portion of the airframe and obstacles around a perimeter of one or more of the hull and the at least one wing; and
a flight control system including a control processor and an operator interface, the at least one proximity sensor being coupled to the control processor, the control processor being configured to receive proximity signals from the at least one proximity sensor and generate so as to present, through the operator interface and based on the proximity signals, situational awareness information of obstacles within a respective predetermined distance of the perimeter of the one or more of the hull and the at least one wing, wherein a positional relationship between the portion of the airframe and the obstacles, as both the portion of the airframe and the obstacles are sensed by the at least one proximity sensor, is presented as part of the situational awareness information.

11. The situational awareness system of claim 10, wherein the at least one proximity sensor comprises one or more of a terrain sensor, an obstacle sensor, a radar sensor, a video imager, and a sonic sensor.

12. The situational awareness system of claim 10, wherein the situational awareness information includes distance data indicating a distance between obstacles and the vertical landing vehicle.

13. The situational awareness system of claim 10, wherein the control processor is configured to present the situational awareness information, through the operator interface, as one or more of visual and aural feedback.

14. The situational awareness system of claim 10, wherein control processor is configured to present the situational awareness information, through the operator interface, as tactile feedback on a flight control of the vertical landing vehicle.

15. The situational awareness system of claim 10, wherein the flight control system comprises an automatic flight control system and the control processor is configured to control a landing approach or hovering of the vertical landing vehicle depending on the proximity signals received from the at least one proximity sensor.

16. A method for providing situational awareness to an operator of a vertical landing vehicle, the method comprising:
coupling at least one proximity sensor to an airframe of the vertical landing vehicle so that at least a portion of the airframe is disposed within a field of view of a respective one of the at least one proximity sensor so that the portion of the airframe is sensed by the at least one proximity sensor, the airframe forming a hull and having at least one wing coupled to the airframe;
receiving proximity signals from the at least one proximity sensor with a control processor of a flight control system of the vertical landing vehicle; and
generating and presenting with the control processor, through an operator interface of the flight control system and based on the proximity signals, situational awareness information of obstacles within a respective predetermined distance of the vertical landing vehicle relative to the hull and the at least one wing, wherein a positional relationship between the portion of the airframe and the obstacles, as both the portion of the airframe and the obstacles are sensed by the at least one proximity sensor, is presented as part of the situational awareness information.

17. The method of claim 16, further comprising presenting the situational awareness information, through the operator interface, as an image of the hull with a terrain map overlay including range indications between at least the hull and terrain adjacent the vertical landing vehicle.

18. The method of claim 17, wherein the image of the hull includes an image of one or more doors or access ramps coupled to the hull.

19. The method of claim 16, further comprising presenting the situational awareness information, through the operator interface, as tactile feedback on a flight control of the vertical landing vehicle.

20. The method of claim 16, wherein the flight control system comprises an automatic flight control system and the method further comprises controlling, with the control processor, a landing approach or hovering of the vertical landing vehicle depending on the proximity signals received from the at least one proximity sensor.

* * * * *